United States Patent
Wade

(10) Patent No.: US 11,710,245 B2
(45) Date of Patent: *Jul. 25, 2023

(54) REAL-TIME MARINE SNOW NOISE REMOVAL FROM UNDERWATER VIDEO

(71) Applicant: Jack Wade, La Jolla, CA (US)

(72) Inventor: Jack Wade, La Jolla, CA (US)

(*) Notice: Subject to any disclaimer, the term of this patent is extended or adjusted under 35 U.S.C. 154(b) by 107 days.

This patent is subject to a terminal disclaimer.

(21) Appl. No.: 17/184,076

(22) Filed: Feb. 24, 2021

(65) Prior Publication Data

US 2021/0279895 A1 Sep. 9, 2021

Related U.S. Application Data

(60) Provisional application No. 62/981,157, filed on Feb. 25, 2020.

(51) Int. Cl.
- *G06T 7/00* (2017.01)
- *G06T 7/254* (2017.01)
- *G06T 5/00* (2006.01)

(52) U.S. Cl.
CPC .............. *G06T 7/254* (2017.01); *G06T 5/002* (2013.01); *G06T 2207/10016* (2013.01); *G06T 2207/20224* (2013.01)

(58) Field of Classification Search
CPC ..................... G06T 7/254; G06T 5/002; G06T 2207/10016; G06T 2207/20224; G06T 5/005; G06T 2207/10024; G06T 7/215; G06T 7/269; G06T 5/00; G06T 5/003; G06T 5/007; G06T 2200/32; G06T 2207/30252; G06T 2207/10144; G06T 2207/152; G06T 2207/20221; G06T 7/593;
(Continued)

(56) References Cited

U.S. PATENT DOCUMENTS

| 6,008,780 A | * | 12/1999 | Clarke | B63C 11/14 2/430 |
| 7,477,207 B2 | * | 1/2009 | Estep | B63C 11/26 345/7 |

(Continued)

FOREIGN PATENT DOCUMENTS

| GB | 2593960 A | * | 10/2021 | G01B 11/25 |
| WO | WO-0200299 A2 | * | 1/2002 | B63C 11/12 |

(Continued)

*Primary Examiner* — Jose L Couso
(74) *Attorney, Agent, or Firm* — Olivo IP Law Group, P.C.; John W. Olivo, Jr.

(57) ABSTRACT

Optical flow refers to the pattern of apparent motion of objects, surfaces, and edges in a visual scene caused by the relative motion between an observer and a scene. Optical flow algorithms can be used to detect and delineate independently moving objects, even in the presence of camera motion. The present invention uses optical-flow algorithms to detect and remove marine snow particles from live video. Portions of an image scene which are identified as marine snow are reconstructed in a manner intended to reveal underwater scenery which had been occluded by the marine snow. Pixel locations within the regions of marine snow are replaced with new pixel values that are determined based on either historical data for each pixel or a mathematical operation, such as one which uses data from neighboring pixels.

6 Claims, 7 Drawing Sheets

(58) Field of Classification Search
CPC ......... G06K 9/6256; G06F 3/14; G06F 3/147; G06V 20/20; G06V 20/56; H04N 7/185; H04N 5/232; H04N 7/181; B63C 11/121; B63C 11/49; B60R 1/00; Y02A 90/30; Y02A 40/81; A63B 33/002; A63B 2225/60; A63B 2244/203; A63B 2071/0638

See application file for complete search history.

(56) References Cited

U.S. PATENT DOCUMENTS

| | | | | |
|---|---|---|---|---|
| 11,528,885 B2* | 12/2022 | Kozachenok | ......... | G06Q 50/02 |
| 11,533,893 B2* | 12/2022 | Howe | .................... | A01K 61/13 |
| 11,587,212 B2* | 2/2023 | Treibitz | .................... | G06T 5/50 |
| 2006/0008137 A1* | 1/2006 | Nagahdaripour | .... | G06V 10/147 |
| | | | | 382/154 |
| 2009/0297059 A1* | 12/2009 | Lee | ........................... | G06T 5/50 |
| | | | | 382/275 |
| 2010/0259651 A1* | 10/2010 | Fattal | ...................... | G06T 5/003 |
| | | | | 348/241 |
| 2012/0281054 A1* | 11/2012 | Cook | ..................... | H04N 7/185 |
| | | | | 348/81 |
| 2013/0201323 A1* | 8/2013 | Davis | ..................... | H04N 5/262 |
| | | | | 348/81 |
| 2016/0099751 A1* | 4/2016 | Koehler | ............... | H04B 5/0031 |
| | | | | 324/693 |
| 2017/0078645 A1* | 3/2017 | Aurigema | ............ | H04N 13/254 |
| 2019/0005658 A1* | 1/2019 | Zamalloa | ............... | H04N 13/15 |
| 2020/0226727 A1* | 7/2020 | Treibitz | .................... | G06T 5/50 |
| 2021/0342988 A1* | 11/2021 | Treibitz | ................. | H04N 9/646 |

FOREIGN PATENT DOCUMENTS

| | | | | |
|---|---|---|---|---|
| WO | WO-2018047638 A1 * | 3/2018 | ............... | G01V 3/08 |
| WO | WO-2019008330 A1 * | 1/2019 | ............. | A01K 61/95 |

* cited by examiner

REAL-TIME MARINE SNOW NOISE REMOVAL FROM UNDERWATER VIDEO

PRIORITY CLAIMS

This application claims the benefit of U.S. Provisional Application Ser. No. 62/981,157 filed on Feb. 25, 2020, the contents of which are incorporated herein by reference.

FIELD OF THE INVENTION

The present invention relates to real-time video enhancement

BACKGROUND

Underwater video is of broad interest in areas such as equipment inspections, surveillance, search & rescue, mine countermeasures, and deep-sea exploration. However, the acquisition of underwater images presents a new set of challenges compared to air space images. In general, underwater visibility tends to be poor due to conditions including poor natural light at different depths, the presence of suspended particles and the consequent scattering of light in all directions. Thus, underwater imagery suffers from poor quality and loss of conveyed information resulting from contrast and color decay, light scattering, blur, haze, and various types of noise. There are numerous image processing methods that can filter out these unwanted effects. However, marine snow is a special type of noise which can profoundly degrade the quality of underwater images and is difficult to filter out.

Marine snow is a phenomenon caused by light back scattering from small organic and mineral particles and air bubbles. These particles tend to grow as they fall down through the water and show up in images as bright spots of various shapes and sizes, which resemble snowflakes.

The problem of filtering out marine snow has been difficult to address because the particles can be quite large and have different structural and lighting characteristics that make them fundamentally different from other types of noise encountered in digital images. Thus, there is a need for a method for marine snow filtering, such as the one presented herein.

SUMMARY OF INVENTION

The present invention seeks to provide a solution to this problem by using optical flow algorithms to remove visual occlusions caused by marine snow in live video.

These and other aspects, objects, features and advantages of the present invention, are specifically set forth in, or will become apparent from, the following detailed description of an exemplary embodiment of the invention.

DETAILED DESCRIPTION OF THE PREFERRED EMBODIMENT

Figure 1:
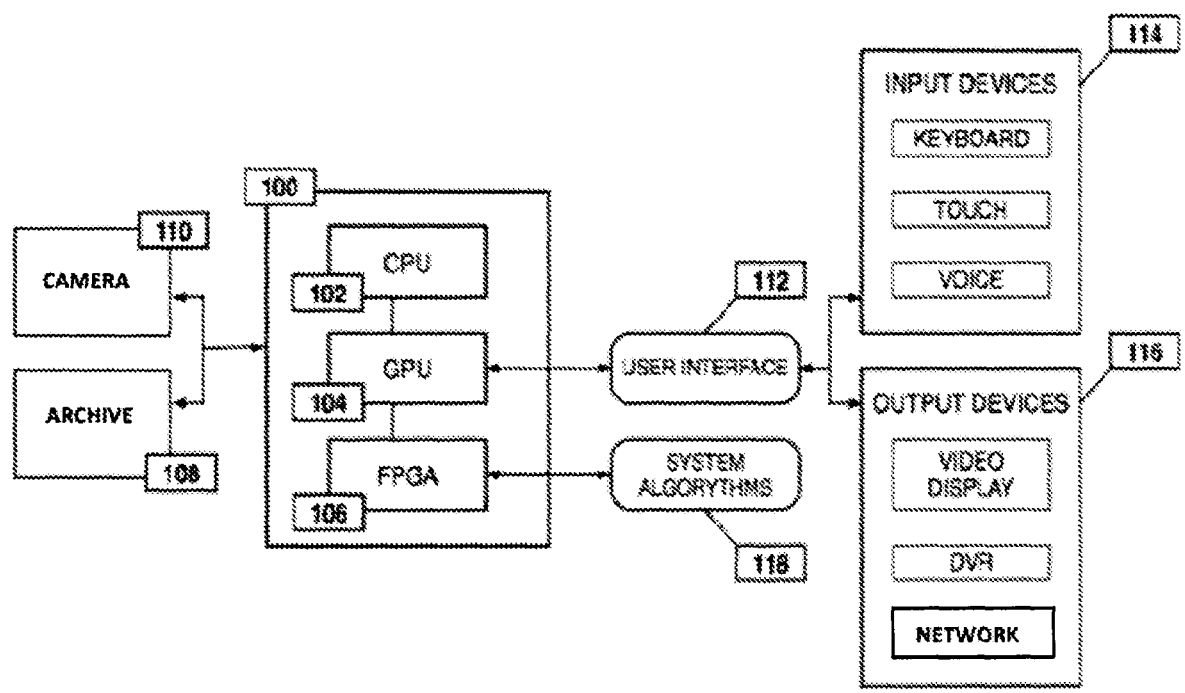
FIG. 1 is a flow diagram of the video processing platform architecture.

In a preferred embodiment, the present invention uses chroma key masks created from optical flow algorithms to remove visual occlusions caused by marine snow in live video. Chroma key is a technique used in video to replace a portion of an image with a new image. For example, chroma key is commonly used in the film industry to replace a monochrome background, such as a green screen, with a different setting. The preferred embodiment uses a chroma key operation to merge pixels from the live video stream with pixels from a synthetic video frame to deliver a video frame with no occluded pixels. The live video frame contains clusters of "snow pixels" that are extracted using optical flow algorithms to create a chroma mask for use in extracting unoccluded live pixels. In essence, this mask replaces particles of marine snow within each video frame with similarly shaped regions of a single color.

The synthetic video contains live unoccluded pixels extracted from the current video frame and unoccluded pixels carried forward from previous frame(s). The merging operation is controlled by a dynamic chroma mask created for each frame by optically identifying and tracking the "snow" particles. The chroma mask chooses a live pixel if not hidden behind a "snow" pixel, otherwise it selects the pixel from the synthetic video frame.

The present invention provides a method for removing certain visual occlusions referred to as marine snow from live underwater video using optical flow algorithms. The preferred embodiment uses optical flow algorithms to create chroma key masks that are used to remove marine snow and merge pixels from the live video stream with pixels from a synthetic video frame to deliver a video with no occluded pixels. The method is described in detail in diagrams and associated text that follows.

For the purposes of this description, image pixels can be defined to exist in one of the following four states: 1) a Live pixel is visible, unoccluded; 2) a Snow pixel is an unwanted waste particle that floats in the frame; 3) a Hidden pixel is one that is hidden by Snow; 4) a History pixel is one that was previously visible but now occluded in the current frame.

There are five basic steps comprising the method for removing marine snow:

1) The live video frame contains clusters of "snow pixels" that are extracted using optical flow algorithms to create a chroma mask for use in extracting unoccluded live pixels.
2) The synthetic video contains live unoccluded pixels extracted from the current video frame and unoccluded pixels carried forward from previous frame(s).
3) The merging operation is controlled by a dynamic chroma mask created for each frame by optically identifying and tracking the "snow" particles.
4) The chroma mask chooses a live pixel if not hidden behind a "snow" pixel, otherwise it selects the pixel from the synthetic video frame.
5) A video frame with no occluded pixels is created as the chroma key operation merges pixels from the live video stream with pixels from a synthetic video frame.

FIG. 1 shows an example architecture of a video processing platform 100 that could be used to implement the method for removing marine snow from video streams. It shows a video input 114 for receiving a video input stream from a connected video camera 110 or video archive 108. Also shown are a connected video display, a DVR storage module and a network module to which the processed video is output 116. The video processing platform 100 integrates a CPU 102 for command and control, a GPU 104 for image processing through a user interface 112, and an FPGA 106 to run the optical flow algorithms 118 in real time. A video controller is also included (not shown) which provides the capability to fuse incoming video with the chroma masks and to encode/decode the IP video streams.

Figure 2:
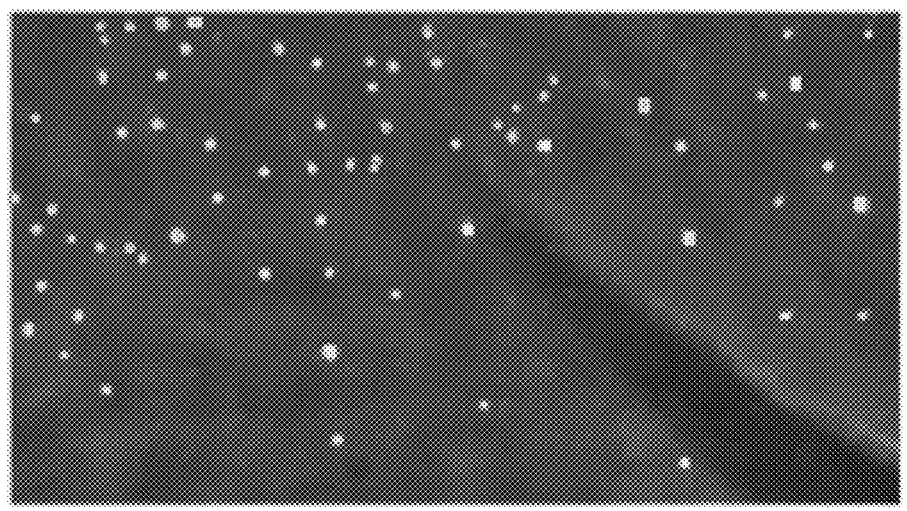
FIG. 2 is an image of a live underwater video stream.

FIG. 2 shows a live underwater video stream that contains snow pixels which hide live pixels.

Figure 3:
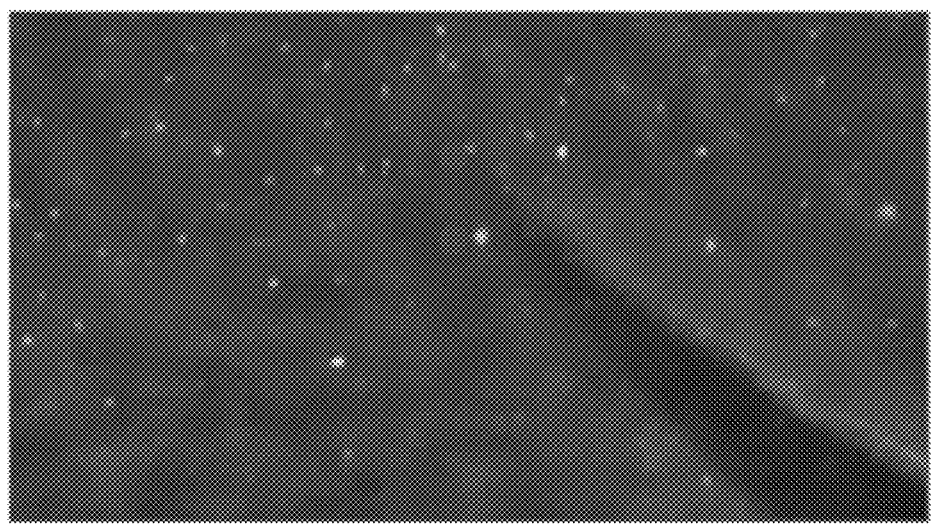
FIG. 3 is an image of a Synthetic Video Frame.

FIG. 3 shows a Synthetic Video Frame which consists of unoccluded Live Pixels from the current video frame and History Pixels carried forward from previous frames. There are no Snow Pixels because they have been replaced with History Pixels carried forward from previous frames.

Figure 4:
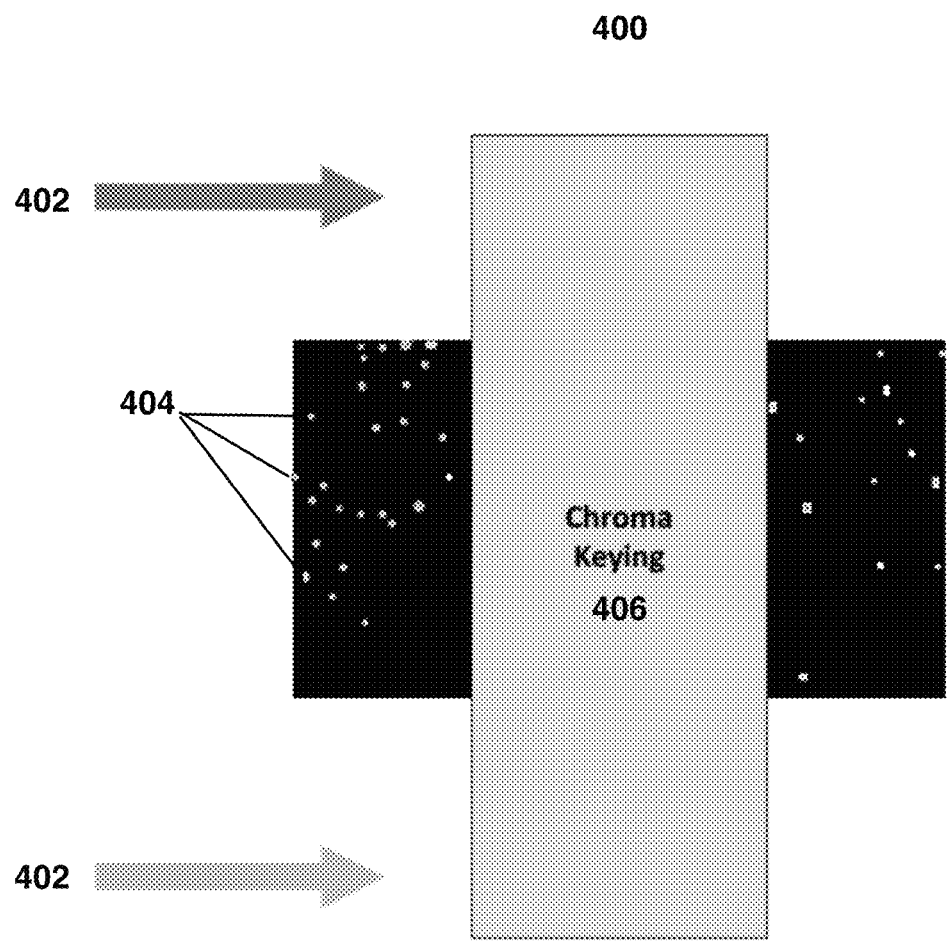
FIG. 4 is a diagram of the Dynamic Chroma Mask.

FIG. 4 shows a Dynamic Chroma Mask 400 created for each frame using Optical Flow algorithms 402 to identify and track floating pixel clusters ("Snow Pixels") 404. Snow Pixel clusters are geo-positioned on the mask in the chroma key 406 color.

Figure 5:
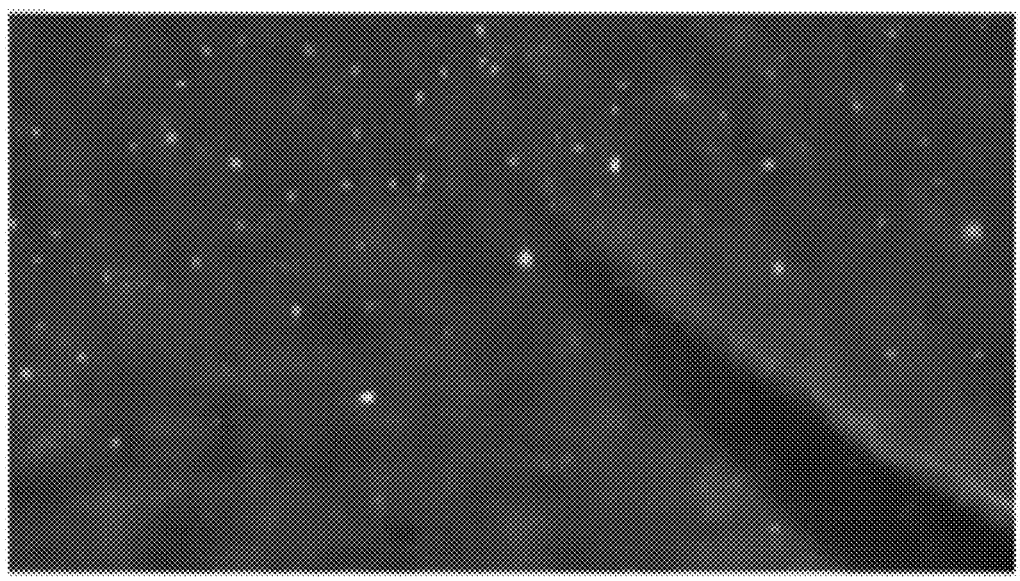
FIG. 5 is an image of an Augmented Live Video Frame.

FIG. 5 shows an Augmented Live Video Frame wherein Snow Pixels have been replaced by History Pixels selected from the Synthetic Video Frame.

Figure 6:
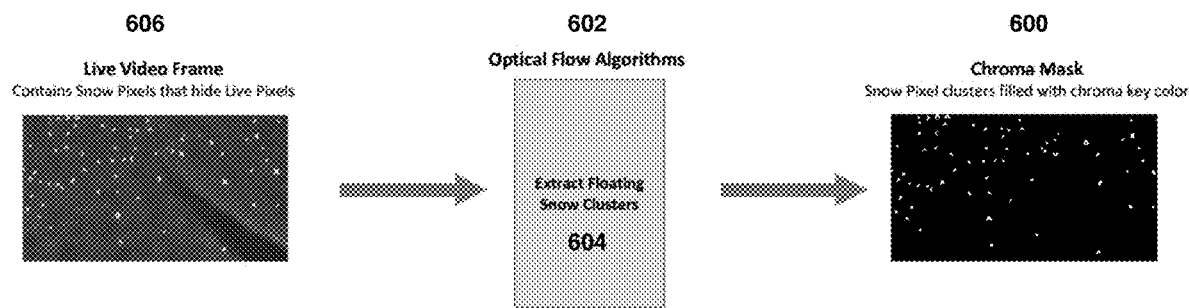
FIG. 6 is a flow diagram of the Dynamic Chroma Mask.

FIG. 6 shows how the Dynamic Chroma Mask 600 is created for each frame to filter out the Snow Pixels from the live video. A Dynamic Chroma Mask 600 is created for each frame using Optical Flow algorithms 602 to identify and track floating pixel clusters ("Snow Pixels") 604. Snow Pixel clusters are geo-positioned on the mask in the chroma key color. The chroma mask will be used to filter out clusters of Snow Pixels from the live video 606.

Figure 7:
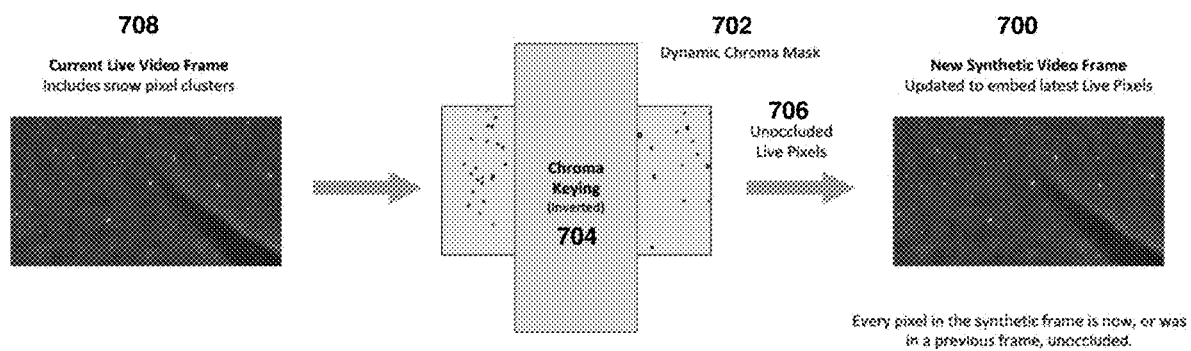
FIG. 7 is a flow diagram of the Synthetic Video Frame.

FIG. 7 shows how the Synthetic video frame 700 is updated as the last operation to prepare for the next frame. When updating the Synthetic video frame through a Dynamic Chroma Mask 702 using inverted chroma keying 704, only unoccluded pixels 706 are extracted from the live video frame 708 to update the synthetic frame 700. The pixels in the synthetic frame that are currently occluded by the snow pixel clusters in the live frame remain and carry forward.

In certain embodiments, pixels in the synthetic frame that are not from the current frame may comprise pixels convolved from neighboring pixels instead of carrying forward the last instance where the pixel was visible.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

What is claimed is:

1. An optical flow sensor to detect the fluctuations in water while immersed within bodies of said water comprising:
    a camera for detecting optical flow events within said water;
    an optical flow comparison process wherein independently moving objects in proximity of said body of water are isolated against a backdrop of water flow not associated with said moving objects and wherein movement of said camera is subtracted from movement associated with said object;
    a process performed by a computer wherein video signals produced by said camera wherein marine snow noise is identified and removed from an overall underwater image, so that said overall underwater image consists of said moving objects and wherein said overall underwater image is relatively clear for human observation, and
    wherein underwater scenery otherwise occluded by marine snow noise become more clearly visible for human observation.

2. An optical flow sensor according to claim 1 wherein pixel locations within water columns with distributions of marine snow noise are replaced with new pixel values that are determined based on either historical data for each pixel or a mathematical operation, such as one which uses data from neighboring pixels by way of geo-positioning.

3. A method for an optical flow sensor to detect the fluctuations in water while immersed within bodies of said water and producing a corresponding data output comprising:

a camera for detecting optical flow events within said water;

an optical flow comparison process wherein independently moving objects in proximity of said body of water are isolated against a backdrop of water flow not associated with said moving objects and wherein movement of said camera is subtracted from movement associated with said object;

a process performed by a computer wherein video signals produced by said camera wherein marine snow noise is identified and removed from an overall underwater image, so that said overall underwater image consists of said moving objects and wherein said overall underwater image is relatively clear for human observation, and wherein underwater scenery otherwise occluded by marine snow noise become more clearly visible for human observation.

4. A method according to claim 3 wherein pixel locations within water columns with distributions of marine snow noise are replaced with new pixel values that are determined based on either historical data for each pixel or a mathematical operation, such as one which uses data from neighboring pixels by way of geo-positioning.

5. A system for providing clear underwater visualization using an optical flow sensor to detect the fluctuations in water while immersed within bodies of said water comprising:

a camera for detecting optical flow events within said water;

an optical flow comparison process wherein independently moving objects in proximity of said body of water are isolated against a backdrop of water flow not associated with said moving objects and wherein movement of said camera is subtracted from movement associated with said object;

a process performed by a computer wherein video signals produced by said camera wherein marine snow noise is identified and removed from an overall underwater image, so that said overall underwater image consists of said moving objects and wherein said overall underwater image is relatively clear for human observation, and wherein underwater scenery otherwise occluded by marine snow noise become more clearly visible for human observation, and wherein pixel locations within water columns with distributions of marine snow noise are replaced with new pixel values that are determined based on either historical data for each pixel or a mathematical operation, such as one which uses data from neighboring pixels.

6. A system according to claim 5 wherein said neighboring pixels include at least said historical data for each of said pixels and wherein said historical data is shared with other third party users of said system's user interface.

* * * * *